UNITED STATES PATENT OFFICE.

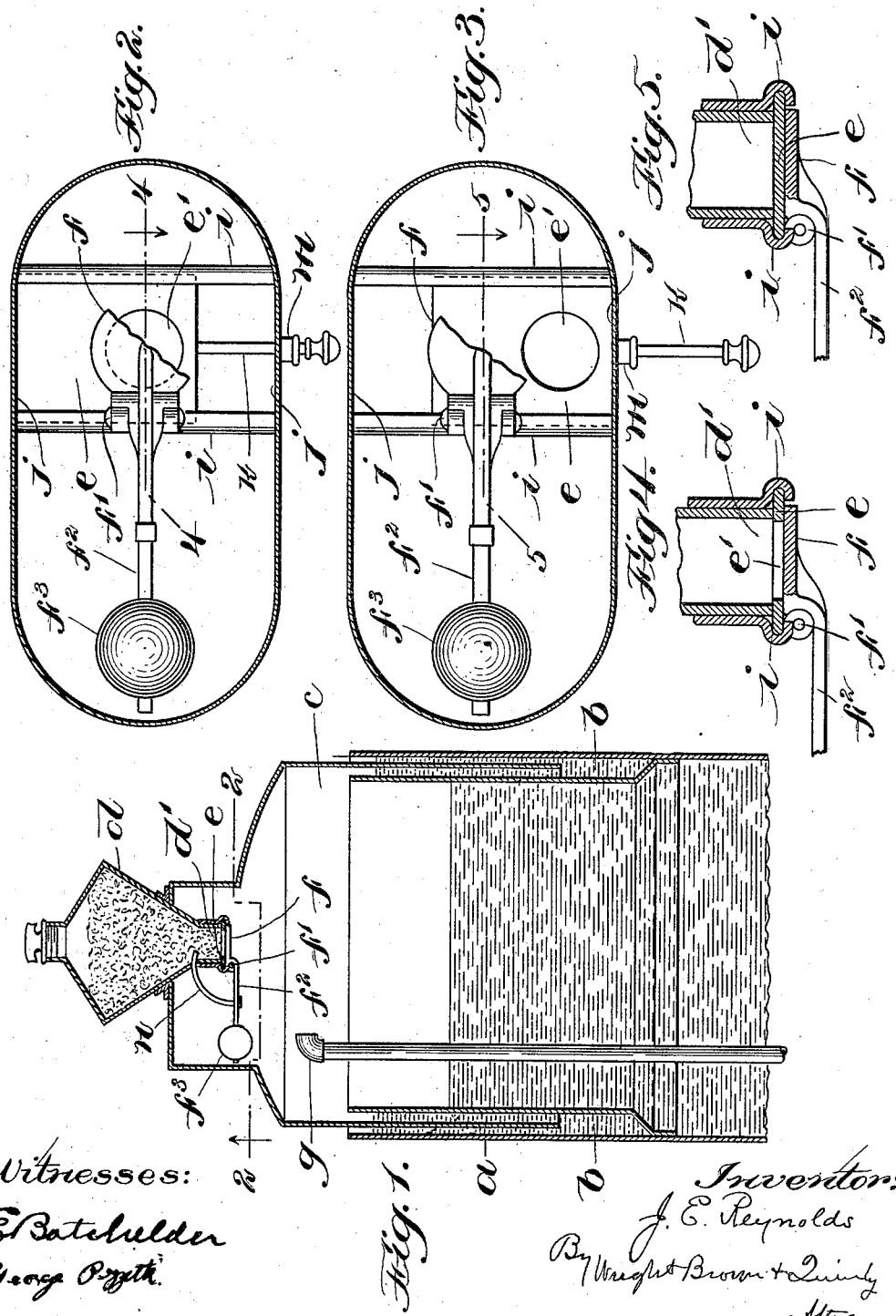

JONATHAN E. REYNOLDS, OF ONSET, MASSACHUSETTS, ASSIGNOR TO OLIVER A. MILLER, OF BROCKTON, MASSACHUSETTS.

ACETYLENE-GAS GENERATOR.

SPECIFICATION forming part of Letters Patent No. 695,233, dated March 11, 1902.

Application filed August 19, 1901. Serial No. 72,468. (No model.)

*To all whom it may concern:*

Be it known that I, JONATHAN E. REYNOLDS, of Onset, in the county of Plymouth and State of Massachusetts, have invented certain new and useful Improvements in Acetylene-Generators, of which the following is a specification.

This invention relates to acetylene-generators in which the carbid in a pulverized or granular form is held in a holder above the body of liquid contained in a tank and has an outlet arranged to deliver carbid to said liquid, the outlet being opened and closed by means actuated by the descent and ascent of the gasometer floating in said tank, the arrangement being such that when the gasometer descends to a given position in consequence of the withdrawal of gas therefrom the carbid-receptacle will be opened and a supply of carbid will be admitted to the liquid in the tank and when the gasometer is raised by the pressure of the gas generated by the reaction of the liquid upon the carbid admitted to it the outlet of the carbid-holder will be closed.

The invention has for its object to provide the outlet of the carbid-holder with means for positively closing said outlet when carbid is being inserted in the holder and for keeping clean or preventing the incrusting of the valve and its seat with carbid, so that the valve, which is held yieldingly closed, is enabled at all times to closely sit upon its seat.

The invention consists in the improvements which I will now proceed to describe and claim.

Of the accompanying drawings, Figure 1 represents a vertical sectional view of the upper portion of an acetylene-generator embodying my invention. Fig. 2 represents a section on line 2 2 of Fig. 1 and a bottom plan view of the parts above said line. Fig. 3 represents a view similar to Fig. 2, showing the slide, hereinafter referred to, in a different position from that shown in Fig. 2. Fig. 4 represents a section on the line 4 4 of Fig. 2. Fig. 5 represents a section on the line 5 5 of Fig. 3.

The same letters of reference indicate similar parts or features in all the drawings wherever they occur.

On the drawings, $a$ represents a tank or reservoir adapted to contain a body of water and having an inner wall which, with the main or outer wall of the tank, forms an annular reservoir $b$.

$c$ represents the gasometer, the lower open end of which is inserted in the annular reservoir $b$, the top of the gasometer being closed, so that it is adapted to float in the annular reservoir $b$ and is supported at various heights therein by the accumulation of gas between the surface of the liquid in the tank and the head or top of the gasometer.

$d$ represents a carbid-holder, which may be of any suitable form, the frusto-conical form here shown being preferred. The holder $d$ is affixed to and extends through the top or dome of the gasometer, its lower end being provided with an outlet $d'$, arranged to discharge carbid into the liquid in the tank $a$.

$e$ represents a slide which extends across the lower end of the outlet $d'$ and is solid or imperforate at one end, so that when in the position shown in Fig. 3 it closes the outlet $d'$ and prevents the escape of carbid therethrough. The slide $e$ is provided near one end with an opening $e'$, which when the slide is in the position shown in Fig. 2 coincides with the outlet $d'$, thus permitting the escape of carbid from the holder $d$, the margin of the orifice $e'$ constituting a seat for the valve, hereinafter referred to.

$f$ represents a valve which is formed to bear against the under side of the slide $e$ and is arranged to coincide with the outlet $d'$, so that when the slide $e$ is in the position shown in Fig. 2 the valve $f$ controls the outlet $d'$, preventing the escape of carbid when closed and permitting the escape of carbid into the tank when open. The valve $f$ is hinged at $f'$ to the lower portion of the carbid-holder $d$ or to any other suitable support and in the embodiment of the invention here shown is held yieldingly closed against the slide $e$ by means of a lever $f^2$, provided with a weight $f^3$, the said weighted lever being adapted to hold the valve in its closed position against the weight of the superincumbent mass of carbid in the holder $d$.

It will be seen that the carbid-holder rises and falls with the gasometer $c$, so that when the gasometer in its descent reaches a predetermined position the weighted lever $f^2$ strikes an offset projection $g$ within the gasometer and is displaced thereby in the direction required to open the valve and permit the escape of the carbid. An additional supply of gas is immediately generated, its pressure raising the gasometer until the lever $f^2$ leaves the projection $g$ and is permitted to close the valve $f$.

When it is necessary to replenish the supply of carbid in the holder $d$, the slide $e$ is moved to its outlet-closing position, as shown in Fig. 3, thus preventing the escape of gas from the gasometer through the carbid-holder during the operation of filling the latter in case the gasometer is at this time depressed, so that the valve $f$ is held open. In case the valve $f$ is closed when the carbid is being inserted in the holder the slide $e$ acts to prevent the forcible impact of the carbid dropping from the top to the bottom of the holder from opening the valve. After the holder $d$ has been charged the slide $e$ is returned to the position shown in Fig. 2, so that the valve $f$ again becomes the sole means of controlling the outlet of the carbid-holder. The back-and-forth movement of the slide $e$ causes the slide to exert a scraping action on the upper surface of the valve and to remove therefrom the accumulations of carbid which would otherwise be caked upon the valve and which would eventually interfere with its proper opening and closing, so that the valve is kept clean and in proper working condtion by the slide $e$.

The slide $e$ is supported by grooved guides $i\ i$, arranged at opposite sides of the opening of the outlet $d'$. Stops $j\ j$ are provided at the ends of said guides to limit the movements of the slide and arrest the latter in the positions shown in Figs. 2 and 3. The slide is moved by means of an operating rod or handle $k$, extending through a stuffing-box $m$, affixed to the gasometer.

$n$ represents a curved finger which is affixed to the valve-operating lever $f^2$ and extends into the lower portion of the carbid-holder $d$, the finger being arranged to be forced into the carbid-holder and agitate the carbid therein by the upward movement of the lever $f^2$. The finger $n$ therefore prevents the carbid from caking in the contracted lower portion of the carbid-holder.

The portion of the slide $e$ containing the opening $e'$ is to all intents and purposes a movable valve-seat interposed between the outlet $d'$ and the valve $f$, the movability of the valve-seat enabling it to scrape or clean the valve, a function that is not dependent on the outlet-closing portion of the slide. Said outlet-closing portion may be considered as an outlet-gate or shut-off connected with the valve-seat.

I claim—

1. In an acetylene-generator, the combination with a fixed liquid-holding tank and a gasometer vertically movable therein, of a carbid-receptacle having an outlet arranged to deliver carbid to the liquid in said tank, a valve coinciding with said outlet, a valve-seat adapted to slide between the valve and the outlet, and means whereby the valve is opened when the gasometer descends to a predetermined position and is closed when the gasometer rises above said position.

2. In an acetylene-generator, the combination with a fixed liquid-holding tank, and a gasometer vertically movable therein, of a carbid-receptacle having an outlet arranged to deliver carbid to the liquid in said tank, a slide movable crosswise of said outlet and having a solid portion forming a closure for the outlet when the slide is in one position, and an apertured portion forming a valve-seat coinciding with said outlet when the slide is in another position, a valve adapted to bear against the bottom surface of said slide in position to cover the valve-seat when the latter coincides with the outlet, and means whereby the valve is opened when the gasometer descends to a predetermined position and is closed when the gasometer rises above said position.

3. An acetylene-generator comprising a fixed liquid-holding tank, a gasometer vertically movable therein, a carbid-holder affixed to the gasometer and having an outlet arranged to deliver carbid to the liquid in the tank, a slide movable crosswise of the said outlet and having a solid outlet-closing portion and an apertured or valve-seat portion adapted to coincide with the outlet, a pivoted valve arranged to close the said outlet, a weighted lever affixed to the valve and adapted to hold the same yieldingly against the slide, and a stop within the tank arranged to displace the weighted lever and open the valve when the gasometer descends to a predetermined position, the lever closing the valve when the gasometer rises above said position.

4. In an acetylene-generator, a carbid-holder, a hinged valve controlling the outlet of said holder, and provided with an operating-lever extending rearwardly of the hinge and a carbid-agitating finger attached to said lever and extending through a hole in the side of the holder into the interior thereof, said finger being arranged to move inwardly when the valve is opening, and outwardly when the valve is closing.

5. In an acetylene-generator, a carbid-holder having an outlet at its lower portion, a valve-seat extending across the lower end of the outlet and movable edgewise, and a hinged valve adapted to be seated on said valve-seat, the movability of the seat enabling it to scrape the upper surface of the valve.

6. In an acetylene-generator, a carbid-holder having an outlet at its lower portion, a valve movable toward and from said outlet, a movable valve-seat interposed between the outlet and the valve, and an outlet-closing gate or shut-off connected with the valve-seat.

In testimony whereof I have affixed my signature in presence of two witnesses.

JONATHAN E. REYNOLDS.

Witnesses:
C. F. BROWN,
E. BATCHELDER.